United States Patent
Shirakawa et al.

(10) Patent No.: US 7,956,023 B2
(45) Date of Patent: Jun. 7, 2011

(54) LUBRICANT SOLUTION FOR MAGNETIC RECORDING MEDIA, CONTAINING FLUORINATED POLYETHER COMPOUND AS LUBRICANT

(75) Inventors: Daisuke Shirakawa, Yokohama (JP); Hidekazu Okamoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 1091 days.

(21) Appl. No.: 11/626,597

(22) Filed: Jan. 24, 2007

(65) Prior Publication Data
US 2007/0116990 A1 May 24, 2007

Related U.S. Application Data

(63) Continuation of application No. PCT/JP2005/013180, filed on Jul. 15, 2005.

(30) Foreign Application Priority Data

Jul. 27, 2004 (JP) .................. 2004-218687

(51) Int. Cl.
C10M 147/04 (2006.01)
C10M 169/04 (2006.01)
C10M 107/38 (2006.01)
C07C 43/12 (2006.01)

(52) U.S. Cl. ........................................ 508/582; 568/677
(58) Field of Classification Search .................. 508/582; 568/677
See application file for complete search history.

(56) References Cited

U.S. PATENT DOCUMENTS 6,080,486 A * 6/2000 Falcone et al. ............... 428/421
2005/0197408 A1 9/2005 Shirakawa et al.
2006/0252910 A1 11/2006 Shirakawa et al.

FOREIGN PATENT DOCUMENTS

| JP | 6-44557 | 2/1994 |
|---|---|---|
| JP | 2001-172683 | 6/2001 |
| JP | 2001-167796 | 7/2001 |
| JP | 2004-75910 | 3/2004 |
| JP | 2004075910 A * | 3/2004 |
| JP | 2005-97248 | 4/2005 |
| JP | 2005-264133 | 9/2005 |
| WO | WO 2004/035656 | 4/2004 |
| WO | WO 2005/068534 | 7/2005 |

OTHER PUBLICATIONS

Product data sheet for HFE-7100, retrieved from the intenet at <http://multimedia.3m.com/mws/mediawebserver?66666UuZjcFSLXTtlxTcm8TtEVuQEcuZgVs6EVs6E666666--> on Mar. 16, 2010.*
Tonelli et al, Journal of Fluorine Chemistry, 1999, vol. 95, pp. 51-70.
Fong et al, IEEE Transactions on Magnetics, 1999, vol. 35, No. 2. pp. 910-915.
Scheirs, Modem Fluororpodymers, John Wiley & Sons Ltd., 1995, pp. 466-468.
Kasai et al, Macromolecules, 1992, vol. 25, pp. 6791-6799.
U.S. Appl. No. 11/742,863, filed May 1, 2007, Shirakawa, et al.
U.S. Appl. No. 12/793,212, filed Jun. 3, 2010, Shirakawa.
U.S. Appl. No. 12/793,757, filed Jun. 4, 2010, Shirakawa, et al.

* cited by examiner

*Primary Examiner* — Glenn Caldarola
*Assistant Examiner* — Jim Goloboy
(74) *Attorney, Agent, or Firm* — Oblon, Spivak, McClelland, Maier & Neustadt, L.L.P.

(57) ABSTRACT

Provided is a lubricant solution for a magnetic recording media, wherein the lubricant solution includes a lubricant that is excellent in chemical stability and capable of imparting excellent lubricity to the lubricant solution, and a solvent having a suitable dissolving power for the lubricant, being excellent in drying properties and not influential over the ozone layer. Also provided is a lubricant solution including a lubricant and a fluorinated alkyl ether. Further provided is a lubricant solution including a compound of the formula $(HO-CH_2-CF_2(OCF_2CF_2)_dO-)_3Y$, wherein Y is a trivalent perfluorohydrocarbon group, as the lubricant and 1,1,2,2-tetrafluoroethyl-2,2,2-trifluoroethyl ether as the fluorinated alkyl ether.

8 Claims, No Drawings

LUBRICANT SOLUTION FOR MAGNETIC RECORDING MEDIA, CONTAINING FLUORINATED POLYETHER COMPOUND AS LUBRICANT

CROSS-REFERENCE TO RELATED APPLICATIONS

The present application is a continuation of International patent application PCT/JP2005/013180, filed on Jul. 15, 2005, which claims priority to Japanese patent application JP 2004-218687, filed on Jul. 27, 2004.

TECHNICAL FIELD

The present invention relates to a lubricant solution to be applied on the surface of magnetic recording media to be mounted on a magnetic disk drive to be used as information storage for computers, etc. More particularly, it relates to a lubricant solution for magnetic recording media, which is excellent in lubricity and which presents high reliability in use for a long period of time.

BACKGROUND ART

In information processing systems for computers, etc., a magnetic disk drive is widely used as an information storage unit. If a magnetic disk drive is used, recording or reading of information can be carried out with a magnetic disk by scanning a magnetic head on the magnetic disk.

However, in recent years, as high density recording on magnetic disks has been advanced, various problems have been reported. For example, decomposition of the lubricant molecules in an operation for a long period of time has become a more serious problem as the environment at the recording portion has become severer.

As a lubricant for magnetic disks, a compound of the following formula (A) is commonly known as a perfluoro-polyether (PTFE) compound having the functional end groups converted to —CH$_2$OH hydroxyl group (wherein each of h and i is an integer of at least 1) (e.g. Non-Patent Document 1):

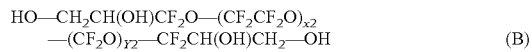

(A)

wherein each of x1 and y1 which are independent of each other, is an integer.

It is known by the document that the surface having a coating film of compound (A) formed by the application of the compound (A) on the substrate surface, is excellent in the nature (self-replenishing property) such that when a part of the coating film becomes defective, the compound (A) around the defective portion will cover the defective portion to replenish the defective portion. Further, it is known that a —CH$_2$OH group present at the molecular terminal of compound (A) is involved in such self-replenishing and adhesive property.

As a perfluoro-polyether compound such as compound (A) has become to be used under a high temperature condition, a compound having a lower vapor pressure has been desired. In an attempt to accomplish a low vapor pressure, it has been attempted to increase the molecular weight, but when it is attempted to increase the molecular weight of the above compound (A), there has been a problem that the viscosity increases remarkably, whereby its application tends to be difficult. Further, there has been a problem that the proportion of —CH$_2$OH groups per unit volume becomes low by the increase of the molecular weight, whereby the self-replenishing property tends to deteriorate.

As a compound to solve such problems, a compound of the following formula (B) has also been proposed (wherein each of h and i is an integer of at least 1), but compound (B) also has a problem that the viscosity is high.

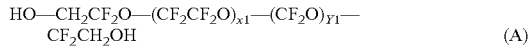

(B)

wherein each of x2 and y2 which are independent of each other, is an integer.

Further, each of compound (A) and compound (B) requires a —OCF$_2$O— unit in its molecular structure. This unit is a unit which causes the decomposition reaction of the compound, and thus, the compound having such a unit has had a problem that it undergoes deterioration in its use (e.g. Non-Patent Documents 2, 3 and 4).

As a compound having no —OCF$_2$O— unit, a compound of the formula (A) wherein —CH$_2$OH end groups are —COOH groups, has been reported. However, such a compound wherein the terminals are —COOH groups, has had a problem that when left under a high temperature condition, —COOH terminals undergo CO$_2$ removal, whereby polar end groups will be lost, and the self-replenishing property will deteriorate. Further, the compound having —COOH groups has had a problem that the acidity of —COOH groups is large, thus causing corrosion.

On the other hand, if pollutants are deposited on the disk surface, there will be a problem such that during the operation of the magnetic disk drive, such pollutants will scatter around, thus causing a trouble such as corrosion of the magnetic head. Various causes are conceivable for such deposition of the pollutants. One of the causes is considered to be derived from a lubricant layer to be formed on the magnetic disk surface for lubricating purpose. Namely, if the lubricant layer is thick and non-uniform, the thick portion of the lubricant layer is likely to be in contact with the magnetic head, whereby the lubricant layer will be scattered.

Heretofore, the lubricant layer was formed, for example, by applying, on a disk surface, a composition having a fluororesin lubricant dissolved in a fluorinated solvent such as a hydrofluorocarbon (hereinafter referred to as HFC) such as 1,1,2-trichloro-1,2,2-trifluoroethane (hereinafter referred to as R113) or 1,1,1,2,3,4,4,5,5,5-decafluoropentane, or a perfluorocarbon (hereinafter referred to as PFC) such as tetrafluorohexane or hexadecafluoroheptane.

R113 was widely used as it is non-flammable and has low toxicity and a dissolving power, and it is also excellent in chemical stability, but it became subject to regulation as a compound highly likely to deplete the ozone layer.

Further, PFC and HFC are compounds which became reduction targets together with carbon dioxide (CO$_2$), dinitrogen monoxide, methane and sulfur hexafluoride (SF$_6$) in the Kyoto Protocol adopted in Third Conference of the Parties to the United Nations Framework Convention on Climate Change in 1997, and their use is expected to be restricted.

On the other hand, a method of using HFE7100 (tradename, manufactured by 3M) being a fluorinated ether, as a solvent for a lubricant to be applied on a magnetic disk surface, is disclosed (Patent Document 2). However, such a fluorinated ether is not necessarily one which shows adequate solubility depending upon the type of the lubricant and has further had a problem that the compositional ratio of isomers changes, whereby a constant drying property may not be obtained.

Patent Document 1: JP-A-6-44557 (page 2)
Patent Document 2: JP-A-2001-187796 (Example 2)

Non-Patent Document 1: "C. Tonelli et al, J. Fluorine Chem.", 1999, Vol. 95, p. 51-70

Non-Patent Document 2: W. Fong et al, "IEEE Transactions on Magnetics", March 1999, Vol. 35, No. 2, p. 911-912

Non-Patent Document 3: J. Scheirs, "Modern Fluoropolymers", John Wiley & Sons Ltd., 1997, p. 466-468

Non-Patent Document 4: P. H. Kasai, "Macromolecules", 1992, Vol. 25, p. 6791

DISCLOSURE OF THE INVENTION

Object to be Accomplished by the Invention

It is an object of the present invention to provide a lubricant solution for magnetic recording media, which comprises a lubricant excellent in chemical stability and capable of imparting excellent lubricity, and a solvent having a suitable dissolving power for the lubricant and being easy to handle, excellent in drying properties and not influential over the ozone layer.

Means to Accomplish the Object (1) A lubricant solution for magnetic recording media, which comprises a lubricant and a fluorinated alkyl ether, wherein the lubricant is made of a fluoro-polyether compound of the following formula (1) and the fluorinated alkyl ether is a compound of the following formula (4):

$$(X—)_e Y(-Z)_f \qquad (1)$$

wherein X is a group of the following formula (2):

$$HO—(CH_2CH_2O)_a\text{-}(CH_2CH(OH)CH_2O)_b—(CH_2)_c—CF_2(OCF_2CF_2)_dO— \qquad (2)$$

wherein a is an integer of from 0 to 100, b is an integer of from 0 to 100, c is an integer of from 1 to 100, and d is an integer of from 1 to 200, Z is a group of the following formula (3):

$$R^F O(CF_2CF_2O)_g— \qquad (3)$$

wherein $R^F$ is a $C_{1\text{-}20}$ perfluoroalkyl group or a group having an etheric oxygen atom inserted between carbon-carbon atoms of such a perfluoroalkyl group, and g is an integer of from 3 to 200, Y is a (e+f) valent perfluorinated saturated hydrocarbon group or such a (e+f) valent perfluorinated saturated hydrocarbon group having an etheric oxygen atom inserted between carbon-carbon atoms, wherein no —OCF$_2$O— structure is present, e is an integer of at least 2, and f is an integer of at least 0, provided that (e+f) is an integer of from 2 to 20, a plurality of X when e is at least 2, may be the same or different, and a plurality of Z when f is at least 2 may be the same or different, $$R^1—O—R^2 \qquad (4)$$

wherein each of $R^1$ and $R^2$ which are independent of each other, is a $C_{1\text{-}4}$ fluorinated alkyl group, provided that the total number of carbon atoms contained in $R^1$ and $R^2$ is from 3 to 6.

(2) The lubricant solution for magnetic recording media according to the above (1), wherein in the formula (2), each of a and b is 0, c is 1, and d is from 3 to 200, or in the formula (2), one of a and b is at least 1 and the other is 0, c is 1, and d is from 3 to 200.

(3) The lubricant solution for magnetic recording media according to the above (1) or (2), wherein the fluorinated polyether compound of the formula (1) has a number average molecular weight of from 500 to 1,000,000 as measured by gel permeation chromatography.

(4) The lubricant solution for magnetic recording media according to any one of the above (1) to (3), wherein (e+f) in the formula (1) is from 2 to 5.

(5) The lubricant solution for magnetic recording media according to any one of the above (1) to (4), wherein f in the formula (1) is 0.

(6) The lubricant solution for magnetic recording media according to any one of the above (1) to (5), wherein the concentration of the fluorinated polyether compound is from 0.01 to 50 mass %.

(7) The lubricant solution for magnetic recording media according to any one of the above (1) to (6), wherein the fluorinated alkyl ether of the formula (4) is 1,1,2,2-tetrafluoroethyl-2,2,2-trifluoroethyl ether.

EFFECTS OF THE INVENTION

The lubricant in the present invention has a low vapor pressure and viscosity and is free from a problem of deterioration during its use.

Further, the lubricant solution of the present invention presents a lubricating film which is excellent in the self-replenishing property and suitable as a lubricating oil for magnetic recording media.

And, the fluorinated alkyl ether being a solvent for the lubricant is a compound which presents no influence over the ozone layer, and it has a suitable dissolving power for the lubricant and is excellent in drying properties. Accordingly, it is capable of forming an extremely thin, uniform lubricant layer and capable of preventing generation of pollutants.

BEST MODE FOR CARRYING OUT THE INVENTION

Now, the present invention will be described in further detail.

(A) Fluorinated Polyether Compound

In the present invention, a fluorinated polyether compound of the formula (1) is used as a lubricant and is referred to as the compound (1). Further, a group of the formula (2) is referred to as the group (2). With respect to other formulae, reference will be made in the same manner.

The present invention provides the following compound (1).

$$(X—)_e Y(-Z)_f \qquad (1)$$

In the compound (1), X is a monovalent group of the following formula (2).

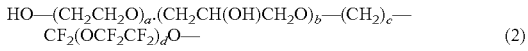

$$HO—(CH_2CH_2O)_a\text{-}(CH_2CH(OH)CH_2O)_b—(CH_2)_c—CF_2(OCF_2CF_2)_dO— \qquad (2)$$

Here, a represents the number of —(CH$_2$CH$_2$O)— units and is an integer of from 0 to 100, preferably an integer of from 0 to 10, more preferably from 0 to 2, particularly preferably 0 or 1, and b represents the number of —(CH$_2$CH(OH)CH$_2$O)— units and is an integer of from 0 to 100, preferably an integer of from 0 to 10, more preferably from 0 to 2, particularly preferably 0 or 1. As a combination of a and b, preferred is a case where each of a and b is 0, a case where a is 0 and b is at least 1 (b is preferably 1), or a case where a is at least 1 (a is preferably 1), and b is 0. c represents the number of —(CH$_2$)— units and is an integer of from 1 to 100, preferably an integer of from 0 to 10, more preferably from 0 or 2. In a case where c is at least 2, c is preferably an even number from the viewpoint of the production efficiency.

d represents the number of —(OCF$_2$CF$_2$)— units and is an integer of from 1 to 200, preferably an integer of from 3 to 100, more preferably an integer of from 3 to 200, particularly preferably an integer of from 3 to 70, further preferably an integer of from 5 to 50. any one of a, b, c and d being 0 means that no such units are present.

The notation of the "—$(CH_2CH_2O)_a$-$(CH_2CH(OH)CH_2O)_b$—" moiety in the formula (2) means that when at least one unit is present with respect to each of the —$(CH_2CH_2O)$— unit and the —$(CH_2CH(OH)CH_2O)$— unit, their arrangement is not particularly limited. Namely, in a case where one unit is present with respect to each of the —$(CH_2CH_2O)$— unit and the —$(CH_2CH(OH)CH_2O)$— unit, the unit which is bonded to the hydroxyl group may be the —$(CH_2CH_2O)$— unit or the —$(CH_2CH(OH)CH_2O)$— unit.

Further, in a case where both the —$(CH_2CH_2O)$— unit and the —$(CH_2CH(OH)CH_2O)$— unit are present, and at least either unit is present in a plurality i.e. at least two units, the arrangement of such units may be in a block form or in a random form, preferably in a block form, more preferably in a block form in the order of the respective units as identified in the formula (2) from the hydroxyl end group.

The following examples may be mentioned for the group (2).

 (1-1)

 (1-2)

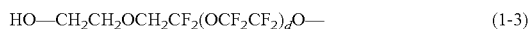 (1-3)

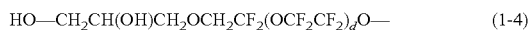 (1-4)

In the formula (1), Z is a monovalent group of the formula (3):

 (3)

Here, $R^F$ is a $C_{1-20}$ perfluoroalkyl group or a group having an etheric oxygen atom inserted between carbon-carbon atoms of such a perfluoroalkyl group. The structure of $R^F$ may be a linear structure, a branched structure, a cyclic structure or a structure partially having a cyclic structure, preferably a linear structure or a branched structure, more preferably a linear structure. The carbon number of $R^F$ is preferably from 1 to 16.

The following groups may be mentioned as specific examples for $R^F$.

$CF_3(CF_2)_s$— (wherein s is an integer of from 0 to 15),
$C_y^F$—$(CF_2)_t$— (wherein $C_y^F$ is a perfluorocyclohexyl group, and t is an integer of from 1 to 14),
$A_d^F$—$(CF_2)_t$— (wherein $A_d^F$ is a group wherein one fluorine atom of a perfluorinated adamantane became a connecting bond, and t is an integer of from 1 to 10).

g is the number of —$(CF_2CF_2O)$— units and is an integer of from 3 to 200, preferably an integer of from 3 to 100, more preferably an integer of from 3 to 70, particularly preferably an integer of from 5 to 50.

The following examples may be mentioned as the group (3).

 (3-1)

 (3-2)

 (3-3)

The compound (1) is a compound having e monovalent groups (X) and f monovalent groups (Z) bonded to Y. Y is a (e+f) valent group and is a perfluorinated saturated hydrocarbon group or a perfluorinated saturated hydrocarbon group having an etheric oxygen atom inserted between carbon-carbon atoms. When it is the latter group, no —$OCF_2O$— structure is present in Y.

e and f which specify the valency of Y, correspond to e which represents the number of X and f which represents the number of Z, respectively. e is an integer of at least 2, preferably an integer of from 2 to 20, more preferably an integer of from 2 to 10. f is an integer of at least 0, and f is preferably an integer of from 0 to 17, more preferably an integer of from 0 to 7. In a case where e is 2 or more, a plurality of X may be the same or different, and in a case where f is 2 or more, the plurality of Z may be the same or different.

(e+f) corresponding to the valency of Y, is an integer of from 2 to 20, preferably an integer of from 2 to 10, more preferably an integer of from 2 to 5.

The (e+f) valent perfluorinated saturated hydrocarbon group for Y is a saturated group composed solely of carbon atoms and fluorine atoms. For example, a perfluorinated bivalent saturated hydrocarbon group is a perfluoroalkylene group. In a case where Y is a group containing an etheric oxygen atom, the number of such etheric oxygen atoms may be one or more, preferably from 1 to 3. The carbon number of Y is preferably from 1 to 50. Specific examples for Y are shown in examples for the compound (1).

The compound (1) may be present as a single compound, but may be present as a composition comprising two or more compounds differing in the numbers for a to d and g, and usually the latter is more readily available.

In a case where the compound (1) is a composition comprising two or more different types of the compound (1), the average of a in the group (2) is preferably an integer of from 0 to 2, the average of b is preferably an integer of from 0 to 2, the number for c is preferably from 1 to 5, the average of d is preferably an integer of from 3 to 100, and the average of g in the group (3) is preferably an integer of from 3 to 100.

The number average molecular weight of the compound (1) is preferably from 500 to 1,000,000, more preferably from 1,000 to 20,000. Further, in a case where the compound (1) is a mixture of at least two types of compounds, the molecular weight distribution ($M_w/M_n$) of the compound (1) is preferably from 1.0 to 1.5, more preferably from 1.0 to 1.25. The molecular weight and the molecular weight distribution of the compound (1) can be measured by gel permeation chromatography, and as the measuring conditions, the conditions disclosed in Examples given hereinafter may be employed.

The following compounds may be mentioned as specific examples for the compound (1) in the present invention. Here, in the following formulae, X and Z are as defined above, and k is an integer of from 1 to 10, provided that in a case where two or more k are present in the same molecule, they may be the same or different from one another.

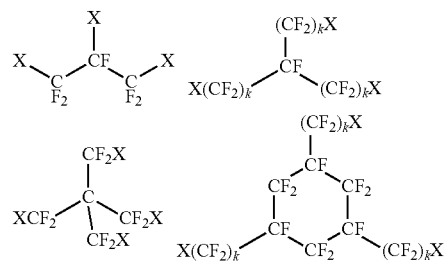

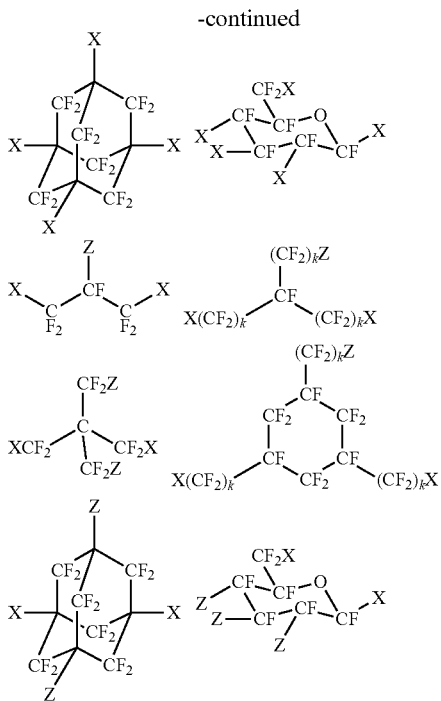

In the compound (1) of the present invention, a unit of —(OCF$_2$O)— is not present. A compound wherein no —(OCF$_2$O)— unit is present, is a compound such that no —(OCF$_2$O)— units are in fact present in the structure of the compound of the formula (1). Otherwise, even if such units were present, they would be present in an amount below the detection limit by a usual analytical method such as ($^{19}$F-NMR).

The compound (1) of the present invention may be produced by the same method as the method disclosed in WO02/4397 or the like from a hydro-polyethylene glycol having a carbon backbone corresponding to the compound (1). As the hydro-polyethylene glycol which may be used as the raw material, ones having various structures or molecular weights are commercially available inexpensively and readily. Otherwise, it can easily be synthesized by adding ethylene oxide to a polyhydric alcohol.

Specifically, a compound of the formula (1) wherein c is 1 can be produced by the following method.

Here, in the following formulae, a to f, R$^F$ and Y are as defined above.

Y$^H$ is the same group as Y or a group having some or all of fluorine atoms in Y substituted by hydrogen atoms. R is the same group as R$^F$, or a group having some or all of fluorine atoms in R$^F$ substituted by hydrogen atoms, preferably the same group as R$^F$. R$^b$ is a monovalent fluorinated organic group, preferably a perfluoroalkyl group or a perfluoroalkyl group containing an etheric oxygen atom. R$^{bF}$ is a monovalent perfluorinated organic group, preferably the same perfluoroalkyl group as R$^b$, or the same perfluoroalkyl group containing an etheric oxygen atom as R$^b$. R$^c$ is an alkyl group. X$^1$ is a chlorine atom or a fluorine atom.

Namely, the following compound (D1) is reacted with the following compound (D2) to obtain the following compound (D3), and the compound (D3) is perfluorinated to obtain the following compound (D4). In the compound (D4), the ester bond is subjected to a decomposition reaction to obtain the following compound (D5). Then, the compound (D5) is reacted with the following compound (D6) to obtain the following compound (D7), or the compound (D5) is hydrolyzed to obtain the following compound (D8). Then, the compound (D7) is subjected to reduction and a decomposition reaction of the ester bond, or the compound (D8) is reduced, to obtain the following compound (1-A). Otherwise, the compound (D7) can also be obtained by subjecting the compound (D4) and a compound of the formula R$^c$—OH (wherein R$^c$ is as defined above) to an ester exchange reaction. Such compound (1-A) is a compound of the formula (1) wherein c is 1 and each of a and b is 0.

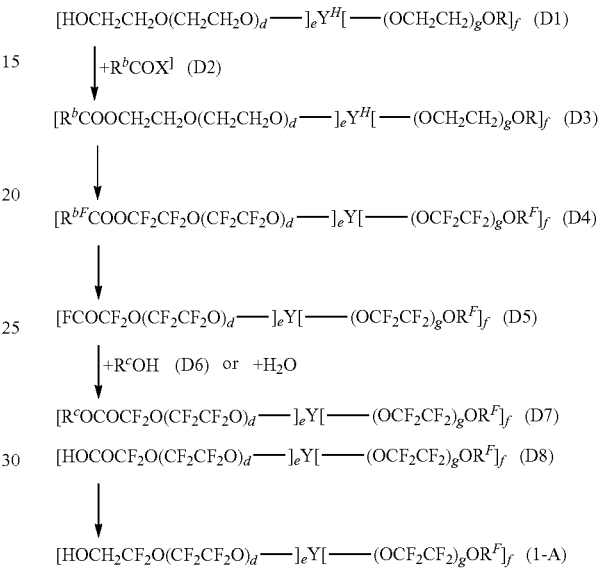

The following compound (1-B) which corresponds to the compound (1) wherein c is at least 2, and each of a and b is 0, can be produced by the following method. Namely, the compound (D5) in the above method, is reacted with iodine (I$_2$) or LiI to convert the terminal-COF group to —I (iodine atom), thereby to obtain a compound (D9). Then, an optional molar amount of ethylene is addition-reacted to the compound (D9) to obtain a compound (D10). Then, the terminal iodine atom in the compound (D10) is alcohol-modified by fumed sulfuric acid or betaine to obtain the compound (1-B).

Here, h in the compound (D10) and the compound (1-B) represents the number of ethylene added by the reaction, and h is preferably from 0 to 100, particularly preferably from 0 to 10, from the viewpoint of the solubility in a solvent in the present invention.

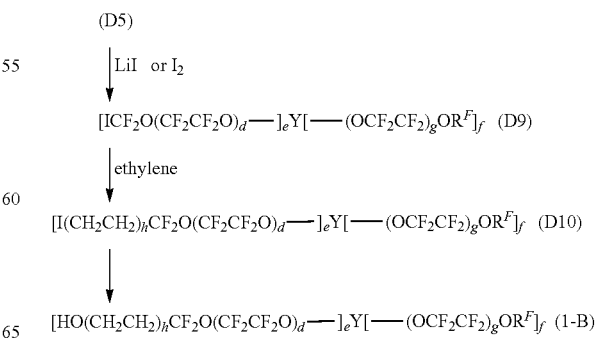

The compound (1) wherein a is at least 1, can be obtained by adding ethylene carbonate and/or ethylene oxide to the compound (1-A) or the compound (1-B) obtained by the above-mentioned method. Further, the compound (1) wherein b is at least 1 can be obtained by adding glycidyl alcohol to the compound (1-A) or the compound (1-B).

The addition reaction of ethylene carbonate and/or ethylene oxide can be carried out in accordance with known methods and conditions. Here, in a case where the fluorine content in the compound (1-A) or the compound (1-B) is high, compatibility with ethylene carbonate and/or ethylene oxide to be used for the addition reaction, is low, whereby the reaction system for the addition reaction may undergo phase separation into two phases. If such phase separation takes place, the reaction time will be long, such being not efficient, and it is preferred to carry out the reaction by adding a solvent to increase the compatibility to the reaction system. As such a solvent, a hydrofluorocarbon (HCFC) may be mentioned.

As the compound (D1) being a starting material for the production method, one which is a mixture of at least two types differing in the number of —(CH$_2$CH$_2$O)— units, is usually readily available. In a case where the above production method is carried out by using the compound (D1) as such a mixture, the compound (1) which will be formed, will also be a mixture.

The respective reaction steps in the method for producing the compound (1) can be carried out in accordance with the methods and conditions in known reactions (for example, the method disclosed in WO02/4397). Further, the reaction steps from the compound (D5) to the compound (D7) and the compound (D8) can also be carried out in accordance with known methods. For example, the reduction step in the production of the compound (D7) and the compound (D8) can be carried out in accordance with the method disclosed in e.g. JP-A-10-72568 (paragraph 0021). Such a reduction step is preferably carried out by using a reducing agent such as NaBH$_4$, borane-THF, lithium aluminum hydride.

The product containing the compound (1) obtained by the above method is usually preferably subjected to purification treatment depending upon the particular purpose to obtain the compound (1) of high purity, whereupon it is used for the desired application.

The content of the compound (1) in the lubricant solution of the present invention may be one which has been heretofore commonly employed, but it is preferably from 0.01 to 50 mass %, more preferably from 0.01 to 5 mass %, particularly preferably from 0.01 to 1 mass %.

(B) Fluorinated Alkyl Ether

The fluorinated alkyl ether constituting the lubricant solution plays an important role from the viewpoint of the solubility and drying properties of the lubricant and the influence to the environment. The fluorinated alkyl ether in the present invention is a compound of the formula (4).

$$R^1—O—R^2 \quad (4)$$

Both $R^1$ and $R^2$ have fluorine atoms having large electrical negativity, whereby it takes a structure excellent in stability.

However, each of $R^1$ and $R^2$ which are independent of each other, is a $C_{1-4}$ fluorinated alkyl group, and the total number of carbon atoms contained in $R^1$ and $R^2$ is from 3 to 6.

When the total number of carbon atoms contained in $R^1$ and $R^2$ is at most 6, the boiling point of the fluorinated alkyl ether will not be too high, and such is preferred in that the drying can be carried out in a short time. Further, when the total number of carbon atoms is at least 3, the boiling point is not too low, such is preferred in that handling such as preparation of a lubricant solution, will be efficient.

The fluorinated alkyl ether in the present invention may be prepared by reacting tetrafluoroethylene with a fluorinated alkyl alcohol in the presence of a catalyst. From the viewpoint of the efficiency in the preparation, 1,1,2,2-tetrafluoroethyl-2,2,2-trifluoroethyl ether (hereinafter referred to as HFE347) or 2,2,3,3-tetrafluoro-1-(1,1,2,2-tetrafluoroethoxy)propane (hereinafter referred to as HFE458) is preferred, and HFE347 is more preferred.

The following fluorinated polyether compounds may be mentioned as preferred lubricants in a case where the fluorinated alkyl ether is HFE347 in the lubricant solution of the present invention. In the following fluorinated polyether compounds, $d^1$ to $d^{13}$ are integers corresponding to d in the formula (2), and $g^1$ to $g^4$ are integers corresponding to g in the formula (3).

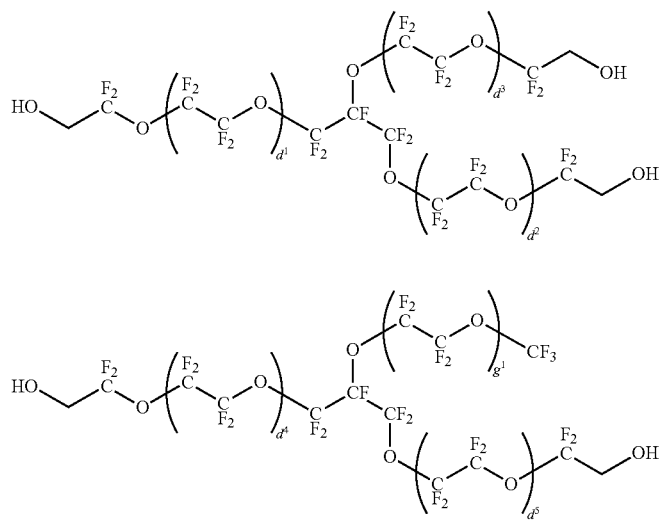

-continued

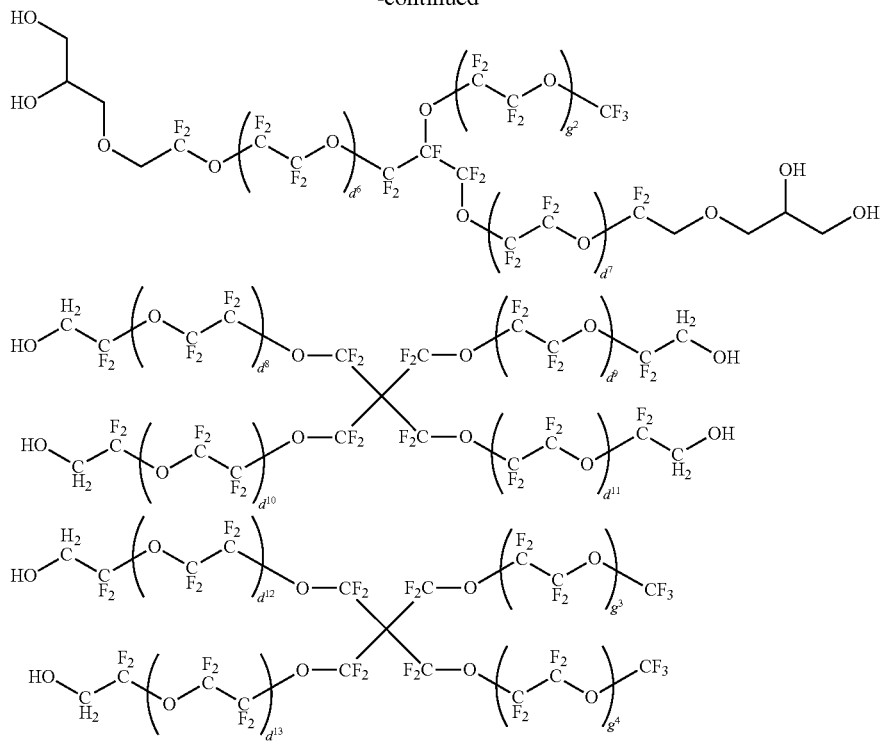

In the present invention, one type of the fluorinated alkyl ether may be used alone, or two or more types may be used in combination.

The content of the fluorinated alkyl ether in the lubricant solution of the present invention is preferably from 50 to 99.99 mass %, more preferably from 90 to 99.99 mass %.

(C) Other Components

The lubricant solution of the present invention may contain, in addition to the above-mentioned fluorinated polyether compound and the above-mentioned fluorinated alkyl ether, other components depending upon the particular purpose.

For example, in order to increase the dissolving power or to adjust the evaporation rate, organic solvents (hereinafter referred to as other organic solvents) other than the fluorinated alkyl ether may further be incorporated.

Preferred examples of such other organic solvents may be at least one member selected from the group consisting of hydrocarbons, alcohols, ketones, ethers (excluding the fluorinated ether of the formula (4)), esters and halogenated hydrocarbons. The lubricant solution of the present invention preferably consists of the lubricant and the above-mentioned fluorinated alkyl ether, but may contain other organic solvents, as the case requires. In a case where it contains other organic solvents, the content of such other organic solvents in the total amount of the solvents is usually at most 40 mass %, preferably at most 20 mass %, more preferably at most 10 mass %. The lower limit for the content of such other organic solvents is the minimum amount whereby the purpose of adding such other organic solvents, can be accomplished. In a case where an azeotropic composition is present with the solvents of the present invention, it is preferred to use them in such an azeotropic composition.

The hydrocarbons are preferably $C_{5-15}$ linear or cyclic, saturated or unsaturated hydrocarbons. Specifically, n-pentane, 2-methylbutane, n-hexane, 2-methylpentane, 2,2-dimethylbutane, 2,3-dimethylbutane, n-heptane, 2-methylhexane, 3-methylhexane, 2,4-dimethylpentane, n-octane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane, 2,2,3-trimethylpentane, 2-methylheptane, 2,2,4-trimethylpentane, n-nonane, 2,2,5-trimethylhexane, n-decane, n-dodecane, 1-pentene, 2-pentene, 1-hexene, 1-octene, 1-nonene, 1-decene, cyclopentane, methylcyclopentane, cyclohexane, methylcyclohexane, ethylcyclohexane, bicyclohexane, cyclohexene, α-pinene, dipentene, decalin, tetralin and amyl naphthalene may, for example, be mentioned. More preferably, n-pentane, cyclopentane, n-hexane, cyclohexane and n-heptane may be mentioned.

The alcohols are preferably $C_{1-16}$ linear or cyclic, saturated or unsaturated alcohols. Specifically, methanol, ethanol, n-propyl alcohol, isopropyl alcohol, n-butyl alcohol, sec-butyl alcohol, isobutyl alcohol, tert-butyl alcohol, 1-pentanol, 2-pentanol, 1-ethyl-1-propanol, 2-methyl-1-butanol, 3-methyl-1-butanol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, propargyl alcohol, benzyl alcohol, cyclohexanol, 1-methylcyclohexanol, 2-methylcyclohexanol, 3-methylcyclohexanol, 4-methylcyclohexanol, α-terpineol, 2,6-dimethyl-4-heptanol, nonyl alcohol and tetradecyl alcohol. Among them, methanol, ethanol and isopropyl alcohol are preferred.

The ketones are preferably $C_{3-9}$ linear or cyclic, saturated or unsaturated ketones. Specifically, acetone, methyl ethyl ketone, 2-pentanone, 3-pentanone, 2-hexanone, methyl isobutyl ketone, 2-heptanone, 3-heptanone, 4-heptanone, diisobutyl ketone, mesityl oxide, phorone, 2-octanone, cyclohexanone, methylcyclohexanone, isophorone, 2,4-pentanedione, 2,5-hexanedione, diacetone alcohol and acetophenone may, for example, be mentioned. Among them, acetone and methyl ethyl ketone are preferred.

The ethers are preferably $C_{2-8}$ linear or cyclic, saturated or unsaturated ethers. Specifically, diethyl ether, dipropyl ether, diisopropyl ether, dibutyl ether, ethyl vinyl ether, butyl vinyl ether, anisole, phenetole, methyl anisole, dioxane, furan, methylfuran and tetrahydrofuran may, for example, be mentioned. More preferred are diethyl ether, diisopropyl ether, dioxane and tetrahydrofuran.

The esters are preferably $C_{2-19}$ linear or cyclic, saturated or unsaturated esters. Specifically, methyl formate, ethyl formate, propyl formate, butyl formate, isobutyl formate, pentyl formate, methyl acetate, ethyl acetate, propyl acetate, isopropyl acetate, butyl acetate, isobutyl acetate, sec-butyl acetate, pentyl acetate, methoxybutyl acetate, sec-hexyl acetate, 2-ethylbutyl acetate, 2-ethylhexyl acetate, cyclohexyl acetate, benzyl acetate, methyl propionate, ethyl propionate, butyl propionate, methyl butyrate, ethyl butyrate, butyl butyrate, isobutyl isobutyrate, ethyl 2-hydroxy-2-methyl propionate, methyl benzoate, ethyl benzoate, propyl benzoate, butyl benzoate, benzyl benzoate, γ-butyrolacton, diethyl oxalate, dibutyl oxalate, dipentyl oxalate, diethyl malonate, dimethyl maleate, diethyl maleate, dibutyl maleate, dibutyl tartrate, tributyl citrate, dibutyl sebacate, dimethyl phthalate, diethyl phthalate and dibutyl phthalate may, for example, be mentioned. Among them, methyl acetate and ethyl acetate are preferred.

The halogenated hydrocarbons are preferably $C_{1-6}$ saturated or unsaturated chlorinated or chlorofluorinated hydrocarbons. Specifically, methylene chloride, 1,1-dichloroethane, 1,2-dichloroethane, 1,1,2-trichloroethane, 1,1,1,2-tetrachloroethane, 1,1,2,2-tetrachloroethane, pentachloroethane, 1,1-dichloroethylene, 1,2-dichloroethylene, trichloroethylene, tetrachloroethylene, 1,2-dichloropropane, dichloropentafluoropropane, dichlorofluoroethane and decafluoropentane may be mentioned.

Further, as other components, radical scavengers (such as X-1p, tradename, manufactured by Dow Chemicals) may, for example, be mentioned.

(D) Application of the Lubricant Solution of the Present Invention to Magnetic Recording Media The lubricant solution of the present invention is used as a lubricant for magnetic recording media.

A layer structure (basic structure) of a magnetic disk as a common magnetic recording medium usually comprises, sequentially from the lower side, a nonmagnetic substrate, a primer layer, a magnetic recording layer (or a magnetic layer), a protective layer and a lubricant layer. In an example of such a magnetic disk, the nonmagnetic substrate is, for example, made of an aluminum substrate and as a NiP film formed by plating on its surface, and its surface is superfinished to make it highly smooth. The primer layer is usually made of a Cr alloy being a nonmagnetic metal. The Cr alloy may, for example, be a CrMo alloy. The magnetic layer is usually made of a CoCr alloy which is a ferromagnetic metal. The CoCr alloy may, for example, be CoCrTa, CoCrPt or CoCrPtTaNb.

Then, on the magnetic recording layer, a protective film is provided to protect the magnetic recording layer from damage by an impact of a magnetic head. The protective film is usually formed of a carbon material such as amorphous carbon and is thus called a carbon protective film. Further, on the carbon protective film, a liquid lubricant solution is applied to form a lubricant layer for the purpose of ensuring smooth flying of a head over the magnetic disk. Here, the above-described layer structure of a magnetic disk is a basic structure, and as a practical layer structure, a more complicated structure may be taken in many cases.

As a method for applying the lubricant solution of the present invention to a magnetic recording medium, it is possible to suitably use, for example, a method such as a Langmuir-Blodgett film-forming method, a dipping method or a method of rotary application by a spinner. For example, in the dipping method, a magnetic disk covered by a carbon protective film is dipped in the lubricant solution at a proper speed, and after maintaining a proper dipping time, it is withdrawn at a suitable speed.

In such a manner, the lubricant is adsorbed on the carbon protective film, and the fluorinated alkyl ether is dried to form a lubricant film on the protective film. The coated thickness of the lubricant may be adjusted depending upon the application conditions, the concentration of the solution and the cleaning conditions.

In the method for applying the lubricant for magnetic recording media according to the present invention, it is preferred to apply the lubricant solution so that the thickness of the lubricant layer after the application would be from 1 to 4 nm, more preferably from 1 to 2.5 nm. When the thickness of the lubricant layer is from 1 to 4 nm, the lubricity is sufficient, and such is preferred in that a sticking phenomenon can be prevented.

EXAMPLES

Now, the present invention will be described in further detail with reference to Examples. However, it should be understood that the present invention is by no means thereby restricted.

In the following, tetramethylsilane is represented by TMS, $CCl_2FCClF_2$ by R-113, dichloropentafluoropropane by R-225, and $CClF_2CF_2CCl_2CF_2CF_3$ by R-419.

Further, NMR spectrum data are shown within an apparent chemical shift range.

Further, the average molecular weight is represented by a number average molecular weight ($M_n$), and it was measured by gel permeation chromatography (hereinafter referred to as GPC).

The measuring method by GPC was carried out in accordance with the method disclosed in JP-A-2001-208736. Specifically, using as a mobile phase a (99:1) solvent mixture of R-225 (Asahiklin AK-225SEC Grade 1, tradename, manufactured by Asahi Glass Company, Limited) and hexafluoroisopropyl alcohol (HFIP), two PLgel MIXED-E columns (tradename, manufactured by Polymer Laboratories Ltd.) were connected in series to constitute a column for analysis. The analysis was carried out by using, as standard samples for measuring the molecular weight, four types of perfluoropolyethers having molecular weights of from 2,000 to 10,000 and molecular weight distributions represented by $M_w/M_n$, and one type of perfluoropolyether having a molecular weight of 1,300 and a molecular weight distribution of at least 1.1. Here, $M_w$ represents the mass average molecular weight, and $M_n$ represents the number average molecular weight. The mobile phase flow rate was set to be 1.0 mL/min, the column temperature was set at 37° C., and as the detector, an evaporation light scattering detector was employed.

Example 1

Example for Esterification Reaction 25 g of commercially available polyoxyethylene glycerol ether (Uniox G-1200, manufactured by Nippon Yushi K.K.), 50 g of R-225 and 2.88 g of NaF were put into a flask, and nitrogen was bubbled with vigorous stirring while the internal temperature was maintained at 25° C. 34.3 g of FCOCF(CF$_3$)OCF$_2$CF(CF$_3$)O(CF$_2$)$_3$F was dropwise added thereto over a period of 1.0 hour, while the internal temperature was maintained at a level of at most 10° C. After completion of the dropwise addition, the mixture was stirred at room temperature for 24 hours, whereupon a crude liquid was recovered. Further, the crude liquid was subjected to filtration under reduced pressure. Then, the recovered liquid was dried for 12 hours in a vacuum drier (100° C., 666.5 Pa (absolute pressure)). The crude liquid thereby obtained was dissolved in 100 mL of R-225 and washed three times with 1,000 mL of a saturated sodium carbonate solution to recover an organic phase.

To the recovered organic phase, 1.0 g of magnesium sulfate was further added, followed by stirring for 12 hours. Then, magnesium sulfate was removed by pressure filtration, and R-225 was distilled off by an evaporator to obtain 52.8 g of a liquid polymer at room temperature. As a result of $^1$H-NMR and $^{19}$F-NMR, The obtained polymer was confirmed to be the following compound (D3-1). Here, the average value of (d$^{14}$+d$^{15}$+d$^{16}$) was 27.0. R$^f$ was —CF(CF$_3$)OCF$_2$CF(CF$_3$)OCF$_2$CF$_2$CF$_3$. M$_n$ was 2,600.

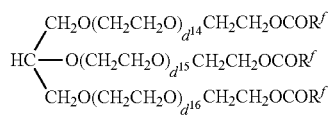

(D3-1)

$^1$H-NMR (300.4 MHz, solvent: CDCl$_3$, standard: TMS) δ (ppm): 3.4 to 3.8, 4.5.
$^{19}$F-NMR (282.7 MHz, solvent: CDCl$_3$, standard: CFCl$_3$) δ (ppm): −76.0 to −81.0, −81.0 to −82.0, −82.0 to −82.5, −82.5 to −85.0, −128.0 to −129.2, −131.1, −144.7.

Example 2

Example for Fluorination of Compound (D3-1) Obtained in Example 1

Example 2-1

Example wherein the Solvent for the Reaction is R-113

Into a 500 mL autoclave made of hastelloy, 312 g of R-113 was added, stirred and maintained at 25° C. at the gas outlet of the autoclave, a condenser maintained at 20° C., a NaF pellet-packed layer and a condenser maintained at −20° C. were installed in series. Here, from the condenser maintained at −20° C., a liquid-returning line to return the condensed liquid to the autoclave, was installed.

After blowing nitrogen gas for 1.0 hour, fluorine gas diluted to 20 mol % with nitrogen gas (hereinafter referred to as 20% fluorine gas) was blown for one hour at a flow rate of 16.97 L/hr.

Then, while 20% fluorine gas was blown at the same flow rate, a solution having 15 g of the product (D3-1) obtained in Example 1 dissolved in 200 g of R-113, was injected over a period of 11 hours, while the 20% fluorine gas was blown at the same flow rate.

Then, 6 mL of a R-113 solution was injected, while 20% fluorine gas was blown at the same flow rate. Further, nitrogen gas was blown for 1.0 hour.

After completion of the reaction, a crude liquid was recovered, and the solvent was distilled off by vacuum drying (60° C., 6.0 hr) to obtain 21.4 g of a liquid product at room temperature. As a result of the analysis of the product, it was confirmed to be the following compound (D4-1) having substantially all hydrogen atom in the compound (D3-1) obtained in Example 1 substituted by fluorine atoms. The proportion of the number of fluorine atoms in the compound (D4-1) corresponding to the number of hydrogen atoms in the compound (D3-1), is at least 99.9 mol %. Further, the average molecular weight (M$_n$) was 4,600. Namely, (d$^{14}$+d$^{15}$+d$^{16}$) in the following formula is a value whereby M$_n$ becomes 4,600.

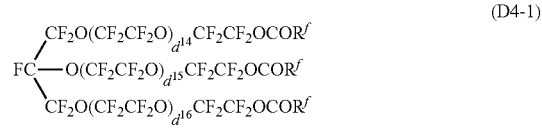

(D4-1)

$^1$H-NMR (300.4 MHz, solvent: R-113, standard: TMS) δ (ppm): 5.9 to 6.4.
$^{19}$F-NMR (282.7 MHz, solvent: R-113, standard: CFCl$_3$) δ (ppm): −77.5 to −86.0, −89.5, −90.0 to −92.0, −120.0 to −139.0, −142.0 to −146.0.

Example 2-2

Example wherein the Solvent for the Reaction is R-419

A reaction was carried out in the same manner except that R-113 in Example 2-1 was changed to R-419. As a result of the analysis of the formed product, formation of the same compound (D4-1) as the product in Example 2-1, was confirmed.

Example 2-3

Example wherein the Solvent for the Reaction is FCOCF(CF$_3$)OCF$_2$CF(CF$_3$)OCF$_2$CF$_2$CF$_3$ A reaction was carried out in the same manner except that R-113 in Example 2-1 was changed to FCOCF(CF$_3$)OCF$_2$CF(CF$_3$)OCF$_2$CF$_2$CF$_3$. As a result of the analysis of the product, formation of the same compound (D4-1) as the product in Example 2-1, was confirmed.

Example 3

Example for Thermal Decomposition of the Compound (D4-1) Obtained in Example 2-1 in Example 2

A 50 mL round-bottomed flask containing a stirrer chip was sufficiently flushed with nitrogen. To the round-bottomed flask, 25 g of 1,1,3,4-tetrachlorohexafluorobutane, 0.20 g of KF and 20 g of the compound (D4-1) obtained in Example 2-1 in Example 2 were added, vigorously stirred and maintained at 120° C. At the outlet of the round-bottomed flask, a condenser maintained at 20° C. and a dryice/ethanol cooling tube were installed in series, and nitrogen sealing was carried out.

Eight hours later, the internal temperature was lowered to room temperature, and then, a vacuum pump was connected to the cooling tube, and while the interior was maintained under reduced pressure, the solvent and the reaction by-products were distilled off. Three hours later, 13.3 g of a product which was liquid at room temperature, was obtained.

As a result of the analysis of the product, formation of the following compound (D5-1) was confirmed. The proportion of the number of —COF groups in the product to the total number of ester bonds in the compound (D4-1) was at least 99 mol %.

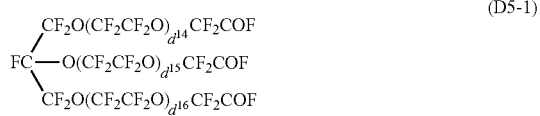

(D5-1)

$^1$H-NMR (300.4 MHz, solvent: R-113, standard: TMS) δ (ppm): 5.9 to 6.4.
$^{19}$F-NMR (282.7 MHz, solvent: R-113, standard: CFCl$_3$) δ (ppm): 12.7, −78.1, −89.5, −90.0 to −92.0, −135.0 to −139.0.

Example 4

Example for Methyl Esterification of Compound (D5-1) Obtained in Example 3

Example 4-1

Example for Production by Esterification Reaction

Into the round-bottomed flask containing the compound (D5-1) obtained in Example 3, 0.9 g of KF and 5.0 g of R-113 were put, followed by vigorous stirring while the internal temperature was maintained at 25° C. Further, 0.5 g of methanol was slowly dropwise added while the internal temperature was maintained at 25° C. or higher.

Eight hours later, stirring was stopped, and a crude liquid was filtered by a pressure filtration apparatus to remove KF. Then, by an evaporator, R-113 and excess methanol were completely removed to obtain 13.5 g of a product which was liquid at room temperature.

As a result of the analysis of the product, formation of the following compound (D7-1) was confirmed. All of —COF groups in the compound (D5-1) were found to be methyl-esterified. The average molecular weight (Mcn) was 3,200.

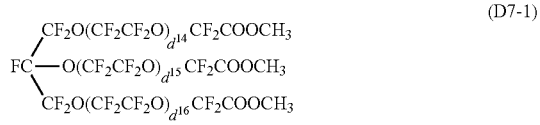

(D7-1)

$^1$H-NMR (300.4 MHz, solvent: R-113, standard: TMS) δ (ppm): 3.95, 5.9 to 6.4.
$^{19}$F-NMR (282.7 MHz, solvent: R-113, standard: CFCl$_3$) δ (ppm): −78.3, −89.5, −90.0 to −92.0, −135.0 to −139.0.

Example 4-2

Production Example by Ester-exchange Reaction

A 50 mL round-bottomed flask containing a stirrer chip was sufficiently flushed with nitrogen. 20.0 g of the compound (D4-1) obtained in the same manner as in Example 2-1 in Example 2 and 1.0 g of methanol were added, followed by vigorous stirring while bubbling was carried out at room temperature. The outlet of the round-bottomed flask was sealed with nitrogen.

Eight hours later, a vacuum pump was connected to the cooling tube to maintain the interior under reduced pressure, and excess methanol and reaction by-products were distilled off. Three hours later, 13.6 g of a product which was liquid at room temperature, was obtained.

As a result of the analysis of the product, formation of a compound (D7-1) was confirmed. The average molecular weight (Mn) of the product was 3,200. The proportion of the number of —COOCH$_3$ groups in the product to the number of ester bonds in the compound (D4-1) was 99.9 mol %.

$^1$H-NMR (300.4 MHz, solvent: R-113, standard: TMS) δ (ppm): 3.95, 5.9 to 6.4.
$^{19}$F-NMR (282.7 MHz, solvent: R-113, standard: CFCl$_3$) δ (ppm): −78.3, −89.5, −90.0 to −92.0, −135.0 to −139.0.

Example 5

Example for Conversion of Compound (D7-1) Obtained in Example 4

13.0 g of the compound (D7-1) obtained by the method in Example 4-2 in Example 4, 240 mL of R-225 and 200 mL of tetrahydrofuran were mixed, and 4.0 g of a borane/tetrahydrofuran complex was added in a nitrogen stream, followed by stirring at room temperature overnight. The solvent was distilled off by an evaporator, and 2 mol/L of hydrochloric acid was added to the residue, followed by extraction with R-225. The extract was concentrated to obtain 11.95 g of a crude product. The crude product was purified by a silica gel column (eluent: R-225/hexafluoroisopropyl alcohol). By $^1$H-NMR and $^{19}$F-NMR, formation of the following compound (1-C) was confirmed. Further, it was confirmed that substantially no —(OCF$_2$O)— units were contained in the compound. The average molecular weight (M$_n$) was 3,000.

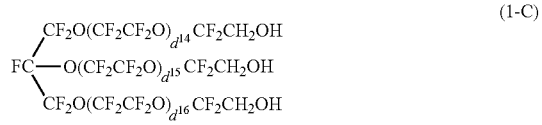

(1-C)

$^1$H-NMR (300.4 MHz, solvent: R-113, standard: TMS) δ (ppm): 3.94.
$^{19}$F-NMR (282.65 MHz, solvent: R-113, standard: CFCl$_3$) δ (ppm): −80.1, −88.2.

Example 6

Example for Stability Test of Compound (1-C)

In a nitrogen atmosphere (100 mL/min), the temperature was raised from 25° C. to 500° C. at a rate of 10° C./min, whereby the mass reduction of the compound (1-C) (25 mg) obtained in Example 5 was measured by a differential thermobalance. As a result, the mass reduction profile was constant, thus showing excellent stability.

Further, also in a case where a stability test of the above identified compound (25 mg) was carried out in the presence of γ-alumina fine particles (0.5 g, N-611N, manufactured by Nikki Chemical Co., Ltd), the mass reduction profile was constant, thus showing excellent stability.

Comparative Example 1

Stability Test of Known Perfluoropolyether

Using a perfluoropolyether essentially containing a —OCF$_2$O— structure (FOMBLIN Z DiOL4000, manufactured by Ausimont Inc.), a stability test was carried out in the same manner as in Example 6. As a result, in the presence of γ-alumina fine particles, the ether underwent decomposition in its entire amount at 250° C. and evaporated as converted to low molecular weight compounds.

Examples 7 to 16 and Comparative Examples 2 to 4

Using a solvent containing HFE347 or HFE458 as an effective component and, as a Comparative Example, HFE-7100 (manufactured by 3M) or R-225, as shown in Table 1, a lubricant was diluted so that the concentration in the lubricant solution would be 0.5 mass %. As the lubricant, the compound (1-C) as a fluorinated polyether compound obtained in Example 5, was used.

A lubricant solution thus obtained was applied to the surface of an aluminum-vapor deposited plate having aluminum vapor deposited on a plate made of iron, and the solvent was dried in air to form a lubricant coating film on the surface of the aluminum-vapor deposited plate, whereby the drying property of the solvent and the state of the obtained coating film were visually observed.

Evaluation of the state of the coating film was represented by ⊚: good coating film, ○: almost good coating film, Δ: irregularity partially observed and X: irregularity substantially observed. Further, evaluation of the drying property was represented by ⊚: immediately dried, ○: dried within 10 minutes, Δ: dried within one hour and X: not dried within one hour. The results are shown in Table 1. In the brackets, the blend mass ratio is indicated.

TABLE 1

| | Solvent | State of coating film | Drying property |
|---|---|---|---|
| Ex. 7 | HFE347 (100) | ⊚ | ⊚ |
| Ex. 8 | HFE347 (95)/isopropanol (5) | ⊚ | ⊚ |
| Ex. 9 | HFE347 (95)/ethanol (5) | ⊚ | ⊚ |
| Ex. 10 | HFE347 (95)/acetone (5) | ⊚ | ⊚ |
| Ex. 11 | HFE347 (90)/methylene chloride (10) | ⊚ | ⊚ |
| Ex. 12 | HFE347 (95)/diethyl ether (5) | ⊚ | ⊚ |
| Ex. 13 | HFE347 (99)/ethyl acetate (1) | ⊚ | ⊚ |
| Ex. 14 | HFE458 (100) | ⊚ | ⊚ |
| Ex. 15 | HFE458 (95)/n-heptane (5) | ⊚ | ⊚ |
| Ex. 16 | HFE458 (95)/ethanol (5) | ⊚ | ⊚ |
| Comp. Ex. 2 | HFE-7100 (100) | Δ | ○ |
| Comp. Ex. 3 | HFE-7100 (95) | Δ | ○ |
| Comp. Ex. 4 | R-225 (100) | X | ⊚ |

In a case where a solution containing the compound 1-C, HFE347 or HFE458, of the present invention was applied, a good coating film state and drying property were observed. Whereas, in a case where HFE-7100 or R-225 was employed, irregularity was observed, and when HFE-7100 was used, the drying time was slightly long.

INDUSTRIAL APPLICABILITY

The present invention is effective as a lubricant solution for magnetic recording media.

The entire disclosure of Japanese Patent Application No. 2004-218687 filed on Jul. 27, 2004 including specification, claims and summary is incorporated herein by reference in its entirety.

What is claimed is:

1. A lubricant solution for magnetic recording media, which comprises a lubricant and a fluorinated alkyl ether, wherein the lubricant is composed of a fluorinated polyether compound of the following formula (1) and the fluorinated alkyl ether is a compound of the following formula (4):

$$(X—)_e Y(—Z)_f \quad (1)$$

wherein
X is a group of the following formula (2):

$$HO—(CH_2CH_2O)_a—(CH_2CH(OH)CH_2O)_b—(CH_2)_c—CF_2(OCF_2CF_2)_d—O— \quad (2)$$

wherein a is an integer of from 0 to 100, b is an integer of from 0 to 100, c is an integer of from 1 to 100, and d is an integer of from 1 to 200, Z is a group of the following formula (3):

$$R^F O(CF_2CF_2O)_g— \quad (3)$$

wherein $R^F$ is a $C_{1-20}$ perfluoroalkyl group or a group having an etheric oxygen atom inserted between carbon-carbon atoms of such a perfluoroalkyl group, and g is an integer of from 3 to 200, Y is a (e+f) valent perfluorinated saturated hydrocarbon group or such a (e+f) valent perfluorinated saturated hydrocarbon group having an etheric oxygen atom inserted between carbon-carbon atoms, wherein no —OCF$_2$O— structure is present, and e is an integer of at least 2, and f is an integer of at least 0, provided that (e+f) is an integer of from 2 to 20, a plurality of X when e is at least 2, may be the same or different, and a plurality of Z when f is at least 2 may be the same or different, with the proviso that a fluorinated polyether compound which satisfies the following conditions: e is 2, f is 0, a is 0 and b is 0, is excluded from the fluorinated polyether compounds according to formula (1);

$$R^1—O—R^2 \quad (4)$$

wherein each of $R^1$ and $R^2$ which are independent of each other, is a $C_{1-4}$ fluorinated alkyl group, provided that the total number of carbon atoms contained in $R^1$ and $R^2$ is from 3 to 6.

2. The lubricant solution for magnetic recording media according to claim 1, wherein in the formula (2), each of a and b is 0, c is 1, and d is from 3 to 200, or in the formula (2), one of a and b is at least 1 and the other is 0, c is 1, and d is from 3 to 200.

3. The lubricant solution for magnetic recording media according to claim 1, wherein the fluorinated polyether compound of the formula (1) has a number average molecular weight of from 500 to 1,000,000 as measured by gel permeation chromatography.

4. The lubricant solution for magnetic recording media according to claim 1, wherein (e+f) in the formula (1) is from 2 to 5.

5. The lubricant solution for magnetic recording media according to claim 1, wherein the concentration of the fluorinated polyether compound is from 0.01 to 50 mass %.

6. The lubricant solution for magnetic recording media according to claim 1, wherein the fluorinated alkyl ether of the formula (4) is 1,1,2,2-tetrafluoroethyl-2,2,2-trifluoroethyl ether.

7. The lubricant solution for magnetic recording media according to claim 1, wherein e is 2, f is 0, and either a or b is at least 1.

8. The lubricant solution for magnetic recording media according to claim 1, wherein e is 2, f is 0, and both a and b are at least 1.

* * * * *

UNITED STATES PATENT AND TRADEMARK OFFICE
CERTIFICATE OF CORRECTION

PATENT NO. : 7,956,023 B2
APPLICATION NO. : 11/626597
DATED : June 7, 2011
INVENTOR(S) : Daisuke Shirakawa et al.

Page 1 of 1

It is certified that error appears in the above-identified patent and that said Letters Patent is hereby corrected as shown below:

Claim 1, column 20, line 20, "HO–$(CH_2CH_2O)_a$–$(CH_2CH(OH)CH_2O)_b$" should read
-- HO–$(CH_2CH_2O)_a$ • $(CH_2CH(OH)CH_2O)_b$ --

Signed and Sealed this
Seventh Day of February, 2012

David J. Kappos
*Director of the United States Patent and Trademark Office*